United States Patent Office
3,042,716
Patented July 3, 1962

3,042,716
MANNICH BASES OF TETRACYCLINE
COMPOUNDS AND AMINO ACIDS
Robert K. Blackwood, Gales Ferry, and Karl J. Brunings,
New London, Conn., assignors to Chas. Pfizer & Co.,
Inc., New York, N.Y., a corporation of Delaware
No Drawing. Filed Dec. 4, 1961, Ser. No. 156,950
5 Claims. (Cl. 260—519)

The present application is concerned with a new group of substituted-tetracycline antibiotics, the acid and base salts thereof and with the process for their preparation. The present substances are derivatives of tetracycline antibiotics with formaldehyde and an amino acid. These new substances are prepared from tetracycline antibiotics by a novel synthetic process and are particularly adapted for therapeutic use by virtue of improved physiological and pharmaceutical properties.

The tetracycline antibiotics comprise a group of biologically active perhydronaphthacene derivatives having the following essential structural features. The numbering system indicated is that employed by "Chemical Abstracts."

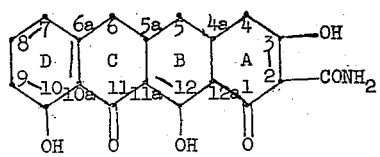

Among the biologically active members of this group are those containing the following substituent groups:

| Substituents | Common Name |
| --- | --- |
| 4-N(CH$_3$)$_2$,6-OH,6-CH$_3$,12a-OH | tetracycline. |
| 4-N(CH$_3$)$_2$,5-OH,6-OH,6-CH$_3$12a-OH | 5-oxytetracycline. |
| 4-N(CH$_3$)$_2$,6-OH,6-CH$_3$,7-Cl,12a-OH | 7-chlorotetracycline. |
| 4-N(CH$_3$)$_2$,5-OH,6-CH$_3$,12a-OH | 6-deoxy-5-oxytetracycline. |
| 5-OH,6-CH$_3$,12a-OH,6-OH | 4-desdimethylamino-5-oxytetracycline. |
| 4-N(CH$_3$)$_2$,6-CH$_3$,12a-OH | 6-deoxytetracycline. |
| 4-N(CH$_3$)$_2$,12a-OH | 6-deoxy-6-demethyl-tetracycline. |
| 4-N(CH$_3$)$_2$,6-OH,6-CH$_3$,7-Br,12a-OH | 7-bromotetracycline. |
| 4-N(CH$_3$)$_2$,6-OH,7-Cl-12a,OH | 6-demethyl-7-chlor-tetracycline. |
| 6-OH,6-CH$_3$,12a-OH | 4-desdimethylamino-tetracycline. |
| 6-OH,6-CH$_3$,7-Cl,12a-OH | 4-desdimethylamino-7-chlortetracycline. |
| 4-N(CH$_3$)$_2$,6-OH,12a-OH | 6-demethyltetracycline. |

The compounds of the present invention are derivatives of tetracycline antibiotics as described above, formed by reaction with formaldehyde and an amino acid which contains an amino group at the ω-position, i.e. on the carbon atom furthest removed from the carboxyl group. Although other such amino acids are contemplated by the present invention, of particular value are ω-amino-alkanoic and α,ω-diaminoalkanoic acids containing from 3 to 6 carbon atoms, for example, β-alanine and lysine (α,ω-diaminocaproic acid). The present new compounds are represented by the following formulae:

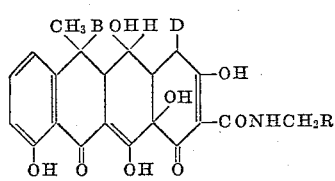

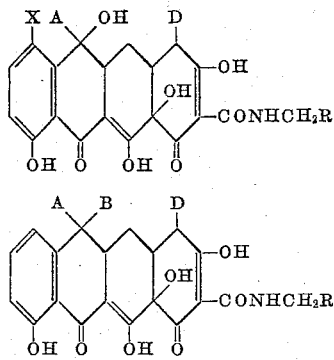

and the acid and base salts thereof, wherein A is selected from the group consisting of H and CH$_3$, B is selected from the group consisting of H and OH, D is selected from the group consisting of H and N(CH$_3$)$_2$, X is selected from the group consisting of Cl and Br, and R together with the associated amino group constitutes the monovalent radical of an amino acid selected from the group consisting of ω-aminoalkanoic and α,ω-diaminoalkanoic acids of from three to six carbon atoms. In the case of α,ω-diaminoalkanoic acids the bonding is through the ω-nitrogen. The present new compounds are amphoteric and thus form salts with both acids and bases.

These novel substances have a number of unique physiological and pharmaceutical properties not shared by the parent antibiotics and derivatives thereof. The subject compounds have a higher water solubility than the corresponding parent antibiotics and the further advantage that their acid salts do not rapidly hydrolyze and precipitate in aqueous media on standing or on adjusting pH over a range of from 3 to 8. Further, the present new compounds appear to be rapidly and completely absorbed from the gastrointestinal tract. They provide to animals the protection against various types of infections either experimentally or naturally contracted. The instant compounds are particularly well adapted for parenteral administration providing longer serum levels than the corresponding parent antibiotic when administered intramuscularly. Their improved water solubility over a wide pH range makes them superior to the parent antibiotics for intravenous administration of the antibiotic. The acid addition salts of the present new compounds are more soluble in both water and hydroxylic organic solvents such as lower alkanols, propylene glycol, glycerol and the like than are the free base forms. This adapts them for use in various sterilized pharmaceutical preparations. The acid addition salts are particularly well absorbed from the gastrointestinal tract and provide satisfactory antibiotic blood levels on either oral or parenteral administration. Animals are protected from infection by organisms sensitive to the antibiotic in vitro.

As previously mentioned, the present new compounds are substances formed by the reaction of the parent antibiotic with formaldehyde and an amino acid. The reaction is effected by merely contacting the selected tetracycline antibiotic with formaldehyde and the amino acid in an aqueous medium which may be modified as desired by the addition of water soluble organic solvents to improve the solubility of the various reagents. For example, the tetracycline antibiotic when employed in the anhydrous free base form is preferably dissolved in a water-miscible solvent e.g. isopropyl alcohol, dioxane, tetrahydrofuran, lower alkyl ethers of ethylene glycol and diethylene glycol such as the dimethyl ether, dimethyl formamide and the like. It is preferred to employ sufficient solvent to maintain the antibiotic in solution when added to the aqueous reaction medium. The reagents may be added simultaneously or individually, in any order. It is generally preferred to add the tetracycline antibiotic to a mixture of formaldehyde and the amino acid since best results are thus obtained. Efficient mechanical mixing of the reaction medium, while not essential, is found particularly helpful, especially during the addition of the tetracycline antibiotic.

The reagents are preferably employed in a substantially equimolar ratio. Although excesses of the formaldehyde and selected amino acid may be employed, no substantial advantage is realized in so doing. Product formation is almost instantaneous on mixing the reagents. The product usually separates as an oil which may be crystallized by conventional procedures. One such procedure involves the addition of the oil to a mechanically agitated nonsolvent after which the solid product is obtained by the usual procedures, for example, filtration. Suitable nonsolvents are acetone, ether, aromatic hydrocarbon, toluene, liquid aliphatic hydrocarbons such as hexane, alkanols such as isopropanol and the like. Other procedures of crystallizing the oily product suggest themselves to those skilled in the art.

The valuable products of the instant invention are capable of forming salts with either acids or bases due to the presence of amino groups and a carboxyl group. For example, lysinomethyltetracycline is capable of forming a mono-, di- or trihydrochloride due to the presence of 3 amino groups. Further, due to the presence of the free carboxyl group, the instant compounds may form a variety of salts with either inorganic or organic bases. Exemplary of these salts are alkali metal salts, such as sodium and potassium salts, the ammonium salt and alkaline earth metal salts, such as the calcium salt, as well as salts with organic amines. Such salts of course are prepared by conventional procedures recognized by those skilled in the art.

The various forms of the tetracycline antibiotic may be employed in the instant process, for example, acid addition salts as well as the free base in either hydrated or anhydrous form. The amino acid employed in the present process may be utilized as the acid addition salts or as the free amino acid. If a salt of either the tetracycline or amino acid is used, it is generally preferred to employ mineral acid salts, exemplified by the hydrochloric acid salts, since these are readily available and give excellent results. These, of course, include phosphoric, sulfuric, nitric, hydrobromic and the like, in addition to hydrochloric acid salts. As is recognized by those skilled in the art, the product obtained will correspond with the selected forms of the tetracycline antibiotic and amino acid. For example, when β-alanine is reacted with tetracycline, the product obtained is the free base β-alaninotetracycline. Alternatively, when lysine hydrochloride is reacted with tetracycline the product obtained is a monohydrochloride, namely, lysinomethyltetracycline monohydrochloride.

When employed in the instant process, lysine may be utilized in one of its optically active forms, for example, D or L-lysine, as the racemic compound, DL-lysine, or as a mixture of the optically active forms. It is generally preferred to employ L-lysine since the L-amino acid is the biologically-active form. The product resulting therefrom may be found more advantageous for use in the animal body. Of course, the product obtained with the other forms of lysine possess the valuable properties as heretofore described.

The antibiotic in vitro spectrum of the present new compounds corresponds with that of the parent antibiotics from which they are derived. The effectiveness of the tetracycline antibiotics is well-documented in the medical literature.

The following examples are given by way of illustration and are not to be construed as limitations of this invention many variations of which are possible without departing from the scope and spirit thereof.

EXAMPLE I

*Amido-N-(Lysinomethyl)Tetracycline Hydrochloride*

To 18.3 g. of L-lysine hydrochloride dissolved in 100 ml. of water is added 10 ml. of 37% aqueous solution of formaldehyde. To the resultant mixture is added 44 g. of anhydrous tetracycline dissolved in 500 ml. of tetrahydrofuran. After thorough mixing the product forms over a period of about 15 minutes as an oily layer which after separation from the aqueous phase is added dropwise to 3 liters of stirred isopropyl alcohol. The product after recovery by filtration, is reslurried with acetone, filtered and dried at 65° C. at reduced pressure.

The product thus obtained has a bioassay of 500 mcg./mg. (*K. pneumoniae* oxytetracycline assay), ultraviolet assay, 46.5% as tetracycline hydrochloride, shows an ultraviolet absorption spectrum in acidified methanol almost identical in shape to that of tetracycline, and shows when spotted as an aqueous solution an $Rf$ value of 0 with a tendency to form a streak out to the same $Rf$ as tetracycline in paper chromatographic system employing the following solvent system: 20:10:3 nitromethane:chloroform:pyridine.

EXAMPLE II

*Amido-N-(Lysinomethyl)Oxytetracycline Hydrochloride*

The procedure of Example I is repeated employing oxytetracycline in place of tetracycline to obtain the corresponding product.

The product has a bioassay of 460–465 mcg./mg. (*K. pneumoniae* oxytetracycline assay) ultraviolet assay, 48.5% as tetracycline hydrochloride, shows ultraviolet spectrum in acidified methanol almost identical with that of oxytetracycline and when spotted as an aqueous solution, shows a streak out to the same $Rf$ exhibited by tetracycline in the same solvent system as employed in Example I.

EXAMPLE III

*Amido-N-(β-Alaninomethyl)Tetracycline*

To a stirred flask, the following reagents are added in order:

| | |
|---|---|
| Water _____ ml__ | 100 |
| β-Alanine _____ g__ | 4.5 |
| Formaldehyde 37% _____ ml__ | 10 |
| Ethylene glycol dimethylether _____ ml__ | 25 |
| Water _____ ml__ | 10 |
| Tetracycline dissolved in 250 ml. of ethylene glycol dimethylether _____ g__ | 22 |

This application in part discloses and claims subject matter disclosed in our copending application Serial No. 814,396, filed May 20, 1959, now abandoned.

Precipitation of a gummy solid begins almost immediately after stirring and continues for almost 5 minutes. The gum is separated from the mixture, placed in 500 ml. of ethylene glycol dimethylether and stirred until a filterable product results. The product is then obtained by filtration followed by ether washing.

The product thus obtained has a bioassay of 650 mcg./mg. (*K. pneumoniae* oxytetracycline assay), ultraviolet assay, 69% as tetracycline hydrochloride, shows an ultraviolet spectrum in acid methanol almost identical in shape to that of tetracycline and when spotted as an aqueous solution shows an $Rf$ value of 0 with a tendency to form a streak out to the same $Rf$ as tetracycline in a paper chromatographic system as described in Example I.

EXAMPLE IV

The product of Example I is converted to the free base by treatment with an aqueous solution containing an equivalent amount of sodium bicarbonate. The free base thus obtained a converted to the dihydrochloride by dissolution in methanol containing 2 equivalents of hydrogen chloride. The product is obtained by evaporation of the resultant solution at reduced pressure.

In a similar manner the product of Example III is converted to the desired hydrochloride salt. Other acid-addition salts of the valuable products of this invention are prepared by the above procedures by substituting for hydrochloric acid, the following: hydrobromic acid, phosphoric acid, sulfuric acid, acetic acid, tartaric acid, malic acid, citric acid, gluconic acid and the like.

EXAMPLE V

The free base corresponding to the product of Example I is dissolved in an aqueous solution containing an equivalent of sodium hydroxide. The resultant solution is frozen and dried under reduced pressure to obtain the sodium salt as a powder.

Similarly, the potassium, calcium and magnesium salts are obtained.

The salts of the present new compounds with pharmaceutically-acceptable acids and bases are particularly valuable for the preparation of various dosage forms. Those wtih pharmaceutically-unacceptable acids and bases are useful for the purification of the present compounds and also for the preparation of pharmaceutically-acceptable salts.

EXAMPLE VI

The procedure of Example I is repeated employing, in place of lysine, the following amino acids:

γ-Aminobutyric acid
α,Δ-diaminovaleric acid
Arginine
Δ-aminocaproic acid

Similar results are obtained.

EXAMPLE VII

The procedure of Example I is repeated employing, in lieu of tetracycline, corresponding tetracyclines to obtain the following products:

Amido-N-(lysinomethyl)chlortetracycline
Amido-N-(lysinomethyl)-6-deoxy-5-oxytetracycline
Amido-N-(lysinomethyl)-4-desdimethylamino-5-oxytetracycline
Amido-N-(β-alaninomethyl)-6-deoxytetracycline
Amido-N-(lysinomethyl)-6-deoxy-6-demethyltetracycline
Amido-N-(lysinomethyl)-7-bromotetracycline
Amido-N-(lysinomethyl)-6-demethyl-7-chlortetracycline
Amido-N-(β-alaninomethyl)-4-desdimethylamino-tetracycline
Amido-N-(lysinomethyl)-4-desdimethylamino-7-chlortetracycline
Amido-N-(lysinomethyl)-6-demethyltetracycline

What is claimed is:

1. A compound selected from the group consisting of

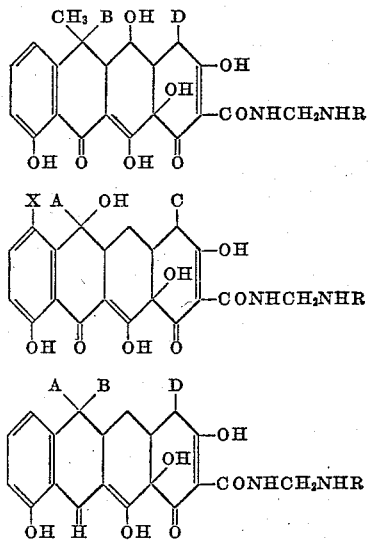

and the acid-addition and base salts thereof, wherein

A is selected from the group consisting of hydrogen and methyl,

B is selected from the group consisting of hydrogen and hydroxy,

D is selected from the group consisting of hydrogen and dimethylamino,

X is selected from the group consisting of chloro and bromo, and

R together with the associated amino group constitutes the monovalent radical of an amino acid selected from the group consisting of ω-aminoalkanoic and α,ω-diaminoalkanoic acids of from three to six carbon atoms.

2. Amido-N-(β-alaninomethyl)tetracycline.
3. Amido-N-(lysinomethyl)tetracycline.
4. Amido-N-(lysinomethyl)tetracycline hydrochloride.
5. Amido-N-(lysinomethyl)oxytetracycline.

No references cited.

UNITED STATES PATENT OFFICE
CERTIFICATE OF CORRECTION

Patent No. 3,042,716                      July 3, 1962

Robert K. Blackwood et al.

It is hereby certified that error appears in the above numbered patent requiring correction and that the said Letters Patent should read as corrected below.

Column 1, lines 65 to 70, for the two-position substituent "-CONHCH$_2$R" read -- -CONHCH$_2$NHR --; column 2, lines 1 to 15, for the two-position substituents of each structural formula, for "-CONHCH$_2$R" read -- -CONHCH$_2$NHR --; column 6, lines 18 to 24, for the 11-position substituent "H" read -- O --.

Signed and sealed this 11th day of September 1962.

(SEAL)
Attest:

ERNEST W. SWIDER                      DAVID L. LADD
Attesting Officer                       Commissioner of Patents